US006523113B1

(12) United States Patent
Wehrenberg (10) Patent No.: US 6,523,113 B1
(45) Date of Patent: Feb. 18, 2003

(54) METHOD AND APPARATUS FOR COPY PROTECTION

(75) Inventor: Paul J. Wehrenberg, Palo Alto, CA (US)

(73) Assignee: Apple Computer, Inc., Cupertino, CA (US)

( * ) Notice: Subject to any disclaimer, the term of this patent is extended or adjusted under 35 U.S.C. 154(b) by 0 days.

(21) Appl. No.: 09/188,917

(22) Filed: Nov. 9, 1998

Related U.S. Application Data

(60) Provisional application No. 60/088,654, filed on Jun. 9, 1998.

(51) Int. Cl.[7] ............................. H04L 9/00; H04L 9/30
(52) U.S. Cl. ...................... 713/176; 380/201; 380/203; 380/210; 380/30
(58) Field of Search ................................ 380/201, 203, 380/210; 713/176

(56) References Cited

U.S. PATENT DOCUMENTS 5,613,004 A * 3/1997 Cooperman et al. .......... 380/28
5,905,800 A * 5/1999 Moskowitz et al. .......... 380/28
6,131,161 A * 10/2000 Linnartz ..................... 713/176
6,141,753 A * 10/2000 Zhao et al. ................. 713/176

OTHER PUBLICATIONS

"Interim Report: Results of Phases I and II", Data Hiding SubGroup Copy Protection Technical Working Group, Version 1.0, May 26, 1998.

* cited by examiner

Primary Examiner—Gilberto Barrón
Assistant Examiner—Paul E. Callahan
(74) Attorney, Agent, or Firm—Beyer Weaver & Thomas, LLP (57) ABSTRACT

Copy protection techniques that utilize a watermark and a permission key are disclosed. The copy protection techniques can provide single-copy copy protection in addition to different levels of copy protection. The permission key and the watermark can also permit the invention to yield variable levels of copy protection. In one embodiment, content including a watermark is transmitted to a recipient. The recipient is allowed to read the content but not record the content unless the recipient possesses a permission key.

18 Claims, 10 Drawing Sheets

METHOD AND APPARATUS FOR COPY PROTECTION

CROSS-REFERENCE TO RELATED APPLICATION

This application claims the benefit of U.S. Provisional Application No. 60/088,654, entitled "METHOD AND APPARATUS FOR COPY PROTECTION", and filed on Jun. 9, 1998, the disclosure of which is incorporated herein by reference for all purposes.

BACKGROUND OF THE INVENTION

The present invention relates generally to copy protection. More specifically, the present invention relates to a method and apparatus for providing copy protection to recorded and broadcast data. The present invention applies to video, audio and other types of data recorded on a medium or broadcast to an audience.

With the proliferation of digital recording, the ability to create unauthorized copies of digitally recorded content has become a serious problem for those that have a vested interested in the content. Copyright laws prohibit the unauthorized copying of copyrighted materials. However, copyright laws seldom prevent individuals from unauthorized copying.

Figure 1:
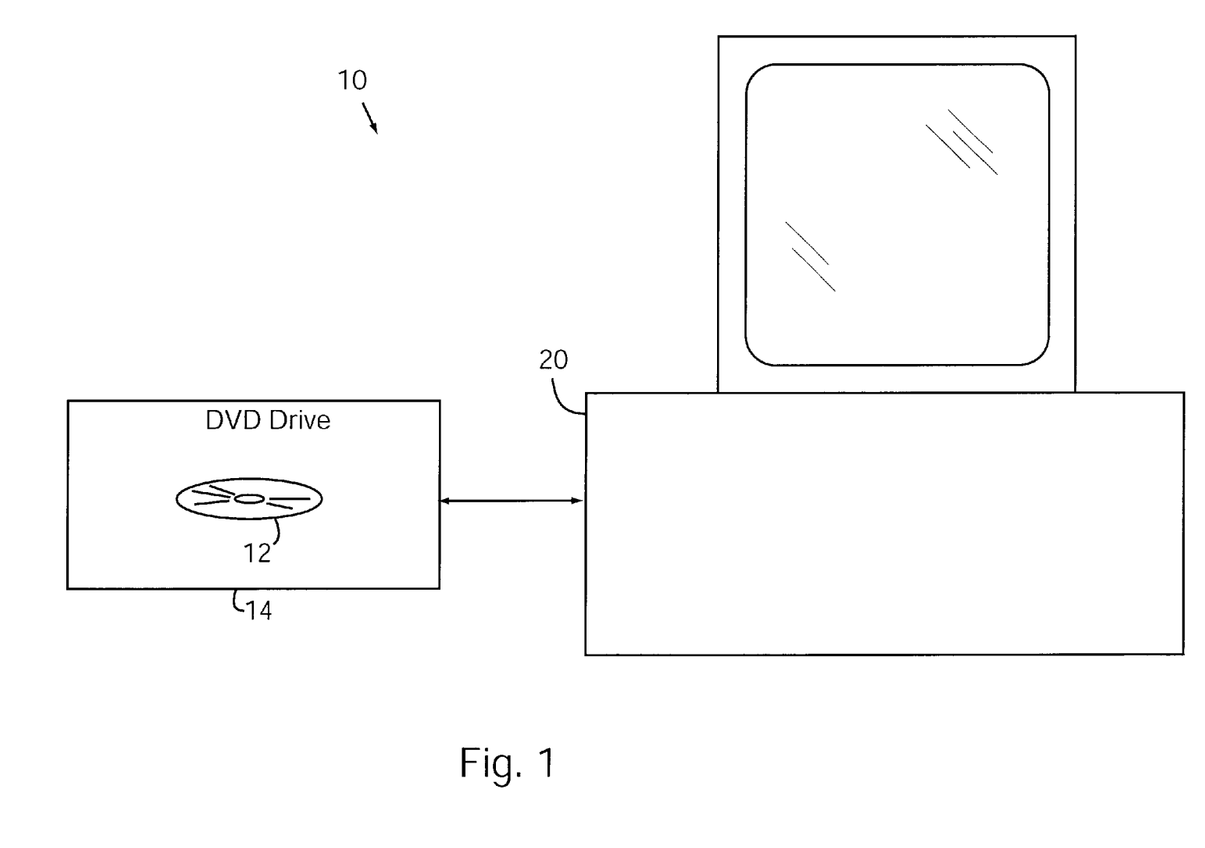
FIG. 1 illustrates a common copy protection scheme.

Current copy protection schemes typically only provide copy protection to digital content stored on a recording medium, such as a Digital Video Disc (DVD) disc (sometimes also referred to as digital versatile disc). FIG. 1 illustrates a conventional copy protection scheme 10. The copy protection scheme includes a host computer 20, a DVD drive 14 which reads data from a DVD disc 12.

In the copy protection scheme illustrated in FIG. 1, DVD drive 14 is capable of reading DVD disc 12 and passing the data to host computer 20. If the DVD disc 12 is copy protected according to a CSS (Content Scrambling System) scheme, the drive will insist on undergoing an authentication protocol with the host 20 before transferring the scrambled data. The scrambled data may only be unscrambled if the "disc key" and the "title key" are known.

Knowledge of a "global key" is necessary to perform the authentication and the exchange of the "disc" and "title" keys. The "global key" is incorporated in drives and in CSS compatible host systems in protected modules such that a user cannot easily obtain access to the "global key". The "global key" allows the host to participate in the "authentication" step, which precedes the transfer of the descrambling keys and the scrambled data. Generally, the "global key" is kept confidential among manufacturers to avoid proliferation of the "global key."

After the authentication protocol has been completed, drive 14 will read disc 12 and obtain "title keys" from a region of the disc which is not accessible to the host, and pass these keys in encrypted form to host 20. The components of the host system 20, which are CSS compliant, are able to decrypt these keys and use the information to descramble the audio/video data subsequently retrieved from the disc.

In this way the CSS scheme prevents easy copying of the data on the disc because "global keys" are necessary to decrypt the descrambling keys, which are necessary to make any sense out of the data, and because the data is passed through user accessible busses only in scrambled form. If a copy of the scrambled data is made, the descrambling keys will be missing.

Copying the descrambled data is made difficult by various techniques, primarily keeping the data off user accessible busses. CSS compliant systems are obligated to inhibit copying of the CSS protected DVD video data. However, CSS encoding does not address the issues of broadcast data and the requirement that the end user be allowed to make a copy for time shifting purposes.

Figure 2:
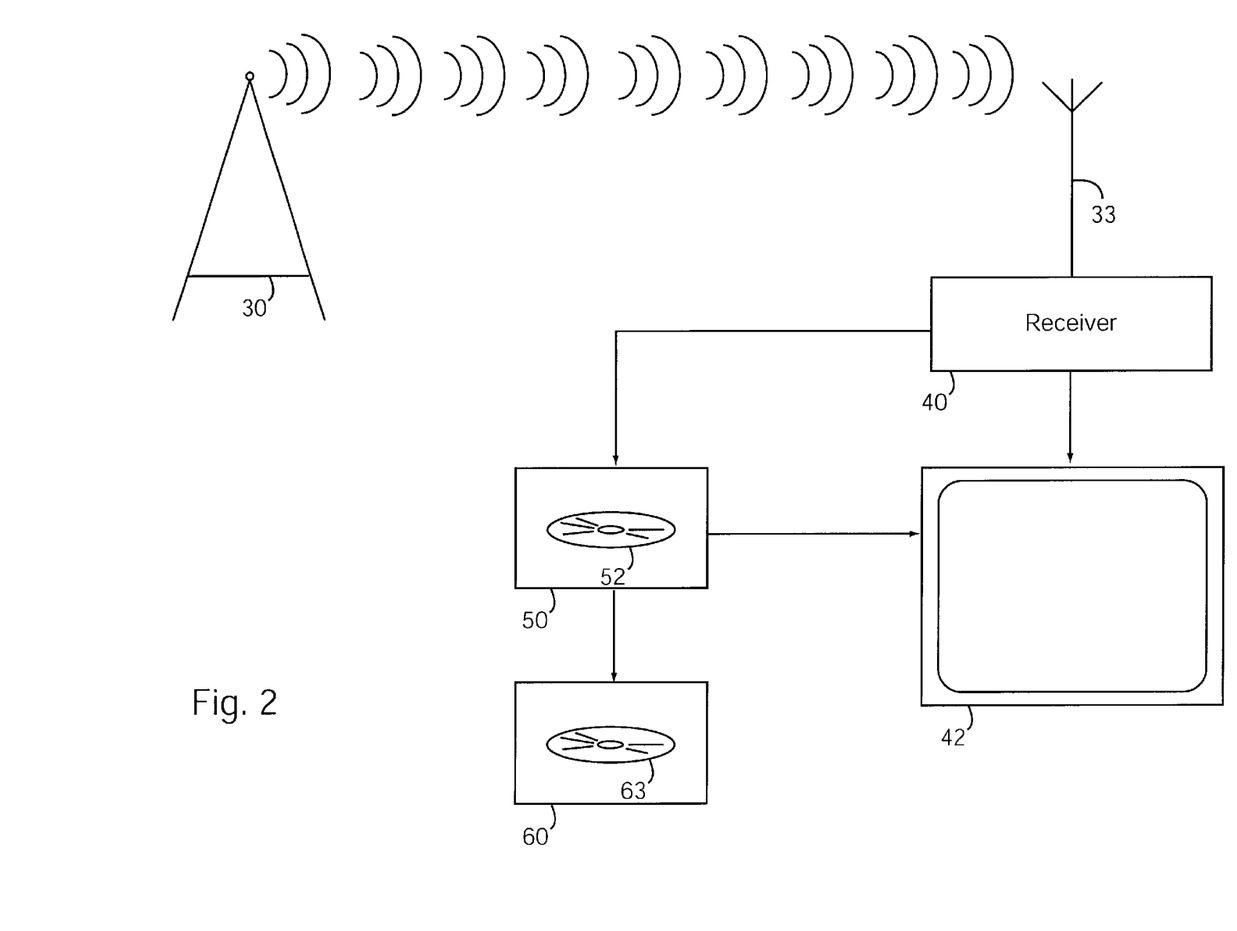
FIG. 2 illustrates a typical television broadcast communication system.

CSS encoding of digital data prevents the unauthorized copying of data stored on a physical medium. However, CSS encoding does not function for content that is broadcast over terrestrial radio frequencies or cable. FIG. 2 illustrates a typical television broadcast communication system. A transmitter 30 transmits audio, video, and/or information data over radio frequencies to an antenna 33. A typical home viewer may possess a set top box 40, a monitor 42, and recording devices 50 and 60.

Antenna 33 receives the data transmitted by transmitter 30 and provides it to set top box 40. Set top box 40 typically demodulates and/or decodes the data transmitted by transmitter 30 and provides a suitable data stream for viewing and/or recording to recorder 50 and monitor 42. A viewer may watch the decoded television signals on monitor 42, or the viewer may wish to record the transmission on recorder 50.

Currently, copyright laws permit a viewer to make a single copy of a transmission for time shifting purposes. That is, a viewer may not be home to view a particular transmission, therefore the viewer may wish to record the transmission and view it at a later time. A consistent problem that has faced broadcasters and content providers is that there is typically nothing to stop a viewer from making multiple generation copies of a transmission. Whether the transmission is broadcast over the airways or through a cable a viewer typically has the ability to make more than one copy of the transmitted content.

Referring back to FIG. 2, the viewer may record the transmitted data on disc 52 using recorder 50. At the same time the viewer may also record the data on disc 63 using recorder 60. Using either one of disc 52 or disc 63 viewer may make an infinite number of copies of the transmitted data.

Currently, copy protection schemes have been utilized to prevent copying of data stored on a medium. However, copy protection schemes typically do not provide copy protection for data that is transmitted. Therefore, there is a need to provide a copy protection scheme that allows a viewer to make one copy of a transmission, but which also prevents further copying after the initial copy is made. Further, the copy protection scheme should also prevent copying of data stored on a recording medium.

SUMMARY OF THE INVENTION

The present invention provides methods and apparatuses of copy protection that utilize a watermark and a permission key. The present invention can provide single-copy copy protection in addition to different levels of copy protection. The permission key and the watermark can also permit the invention to yield variable levels of copy protection.

In one embodiment, content including a watermark is transmitted to a recipient. The recipient is allowed to read the content but not record the content unless the recipient possesses a permission key. In a still further embodiment, the permission key is transmitted along with the content to permit recording. In another further embodiment, the permission key is a disposable permission key such that the permission key is not recorded and subsequent copies are prohibited. Alternately, the permission key is provided to the recipient at a different time to permit recording. In a still further embodiment, the permission key may be variable, wherein the permission key changes and the content requires more than one permission key.

In another embodiment, a copy protection compatible recording device is disclosed. The recording device is permitted to record a content including a watermark if a permission key is provided. The recording device includes a controller and a recording mechanism. The controller extracts a watermark from the content. When a watermark indicating that the content is copy protected, the controller must receive a corresponding permission key in order to allow the recording mechanism to record the content on a recording medium.

If a further embodiment, a copy protection compatible receiver is disclosed. The receiver includes a decoder, a permission key extractor, a decompressor and an interface. The decoder receives transmitted content including a watermark, and a permission key. The permission key extractor separates the permission key from the content. The interface receives the permission key and the content, separately, and provides them to a copy protection compatible recording device. The decompressor also receives the content without the permission key and decompresses the content, if necessary.

The use of a permission key and a watermark provides a versatile method of copy protecting content. The present invention provides copy protection that allows a recipient to make a single copy of the content, but prevents further copying of the content. Also, other levels of copy protection are supported by the use of permission keys and watermarks.

One advantage of the present invention is that playback control is not required. Without playback control watermark detection is not required of the playback devices.

These and other advantages of the present invention will become apparent to those skilled in the art upon a reading of the following descriptions of the invention and a study of the several figures of the drawing.

DETAILED DESCRIPTION OF THE PRESENT INVENTION

The present invention provides methods and apparatuses of copy protection that utilize a watermark and a permission key. The present invention can provide single-copy copy protection in addition to different levels of copy protection. The permission key and the watermark can also permit the invention to yield variable levels of copy protection. The copy protection can be used to prevent unauthorized copying of data stored on a recording medium. In one embodiment, the copy protection can permit a viewer or user to make a single copy of the data but prevent any further copies from being made.

The present invention utilizes watermarks and a permission key to provide a more versatile system of copy protection. A watermark is data that is typically encoded into a signal such that an observer or listener can not distinguish the watermark from the original signal. By way of example, a watermark may be added to a video image. The watermark is added such that a viewer cannot discern that the original video image has been altered in any way. However, a decoder placed in a set top box, recording device, or monitor may detect the watermark. Watermarks are discussed in further detail in the "Interim Report: Results of Phases I and II" of the Data Hiding Sub Group of the Copy Protection Technical Working Group, Version 1.0, May 26, 1998.

In one embodiment, the inclusion of the watermark may indicate that the content, or data, is copy protected. Further, the value of the watermark may be used to inform the receiving device of the level of copy protection. For example, certain types of content, whether broadcast or recorded, may be completely copy protected; other types of content may not be copy protected at all. The value of the watermark may designate the different levels of copy protection. The present invention are described in relation to one of the most difficult problems—permitting one copy of content while preventing additional copies. However, the present invention may be used for all different levels of copy protection. Additionally, a watermark may be used for a variety of other functions.

According to one embodiment of the present invention, once a watermark is detected that indicates the accompanying content is copy protected the receiving device looks for a permission key to permit any type of recording. For content that is transmitted, the permission key is transmitted simultaneously with the content and watermark. The permission key may be encrypted to prevent extraction of the permission key, which may facilitate unauthorized copying. Any suitable type of encryption scheme may be used such that the receiving device may adequately decrypt the permission key. The receiving device is designed not to permanently store the permission key once it has been received. That is, the permission key is disposable.

The permission key may be formulated to correspond to the watermark. The receiving device may compare the permission key to the watermark to ensure that the correct permission key for the particular content has been received. Alternately, the permission key may correspond to other criteria. By way of example, the permission key may be a pseudo-random code with a seed that is known to the content provider and the receiving device. In an alternate embodiment, the permission key may be a constant value but an encryption key may be varied over time. The encryption key may be conveyed to the receiving device over a different medium, such as phone lines. Such systems have been successfully used in home satellite services.

Other suitable methods of conveying a permission key without the recipient becoming aware of the permission key may be utilized in accordance with the present invention. So long as a watermark is included in the content and a permission key is provided, the recipient of the content is allowed to make a copy of the content. However, since the permission key is typically disposed future copies are prevented because the permission key is not available.

Similarly, content with a watermark that is distributed on a recording medium cannot be copied because the permission key is not included on the recording medium. However, provisions may be made such that the content provider may permit copying. By way of example, a consumer may purchase a compact disc. The compact disc may contain audio tracks that include a watermark that is undetectable by the consumer. Should the consumer wish to make a copy of the audio track, the consumer may purchase the right to copy over the Internet, or other form of communication system. The permission key, in encrypted form, may be transmitted to the consumer to allow a copy of the audio track to be made. It will be appreciated that many different methods and techniques for delivering a permission key may be utilized in accordance with the present invention.

The present invention is further described in relation to video images as a type of content. But, the present invention may be applied to any suitable type of electronic data. By way of example, the present invention may be applied to audio data, computer data, or any other type of suitable electronic data.

Figure 3A:
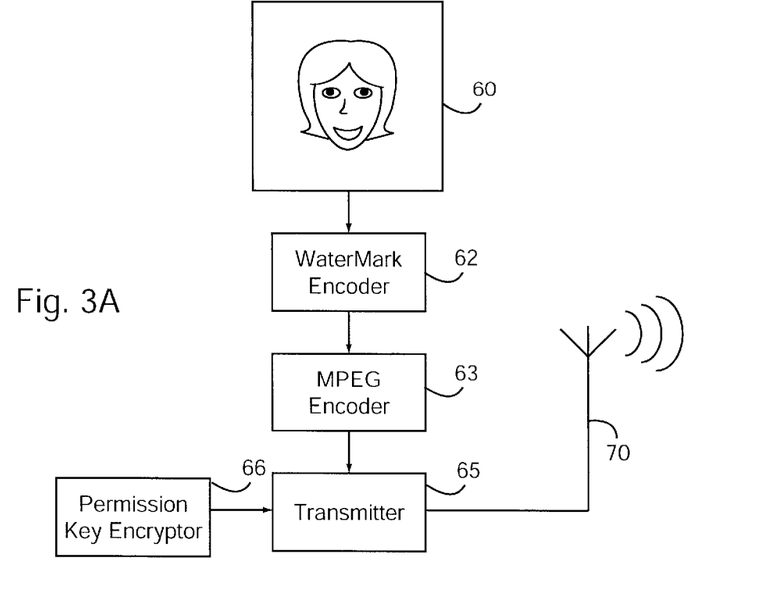
FIG. 3 illustrates an encoding system for adding a watermark and a permission key to a transmission in accordance with an embodiment of the present invention.
Figure 3B:
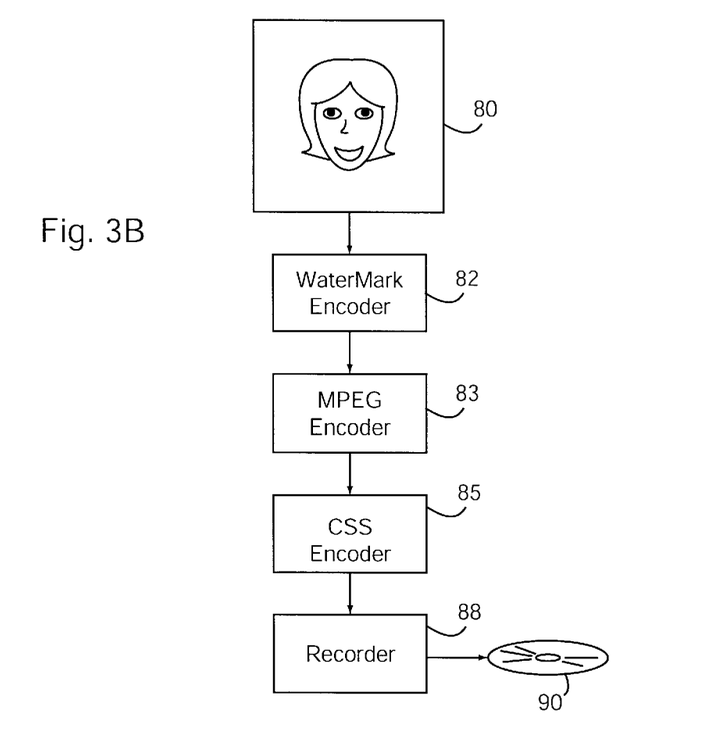

FIG. 3 illustrates an encoding system for adding a watermark and a permission key to a transmission in accordance with one embodiment of the present invention. The encoding scheme includes a video image source 70, a watermark encoder 72, an MPEG encoder 73, a permission key encryptor 76, a transmitter 75 and an antenna 80. Video source 70 provides an original video image. Watermark encoder 72 receives the original video image and encodes a watermark into the original video image such that the watermark is not discernible from the original video image. The watermark may be configured to be easily extracted from the video image if the decoding device is aware of the configuration of the watermark. Otherwise, the watermark is difficult to extract.

Watermark encoder 72 provides the encoded (watermarked) video image to MPEG encoder 73. MPEG encoder 73 compresses the encoded video image into an MPEG image. Transmitter 75 receives the MPEG compressed image from MPEG encoder 73 and also receives an encrypted permission key from encryptor 76. Transmitter 75 combines the two pieces of information into a single data stream, which is then transmitted over antenna 70 to a number of receivers.

A receiver receives the compressed content and encoded watermark along with an encrypted permission key. The receiving device must be a compatible receiving device in order to be able to decode the watermark and decrypt the permission key. A receiving device may be a set top box receiver, a recording device, a monitor, a computer or any other suitable type of receiving device. If not already a part of the receiving device, the receiving device must operate with a compatible recording device in order to be able to record the transmitted information. However, the viewers need not possess any other devices other than a suitable set top box and a monitor to be able to simply view the transmitted images without recording, which is discussed in further detail below.

The present invention generally requires a permission key to allow a viewer or a purchaser to make any type of copies. When data is transmitted over the airways or through a cable a permission key is sent along with the data in order to allow one copy to be made. A watermark is incorporated into the data, which signifies that the data is copy protected. When a suitable receiving device receives the data along with an encoded watermark it also checks to see if a permission key has been sent along to authorize copying. If a permission key is included the receiving device permits viewing and/or recording of the data encoded with the watermark. However, the permission key is never stored or recorded on any medium. Rather, the permission key is discarded such that further copying is not permitted.

In the case of content stored on a recording medium, a permission key is not included. A permission key is not included because a purchaser of the content is not entitled to make a copy for time shifting purposes. A purchaser of content may be permitted under the current copyright laws to make a back up of the content for archival purposes. In such a case a permission key may be included with the content on the recording medium, in accordance with an alternate embodiment of the present invention. In a still further embodiment, archival copies may be permitted through alternate forms of delivery of the permission key, as discussed above.

In a situation where a permission key is included with the content on a recording medium, the compatible recording and playing devices will not allow copying of that permission key onto the back up or archival copy. By those means, the permission key prevents any unauthorized copy of content that is transmitted or that is sold on a recording medium.

Suitable receiving and/or recording devices are used to implement the copy protection system provided by the present invention. A suitable receiver or recording device possesses the ability to extract a permission key from transmitted content and check to verify that a permission key is included in the transmission. Also a suitable recording device will allow copying of the transmitted content onto a recording medium but without copying the permission key.

Figure 4:
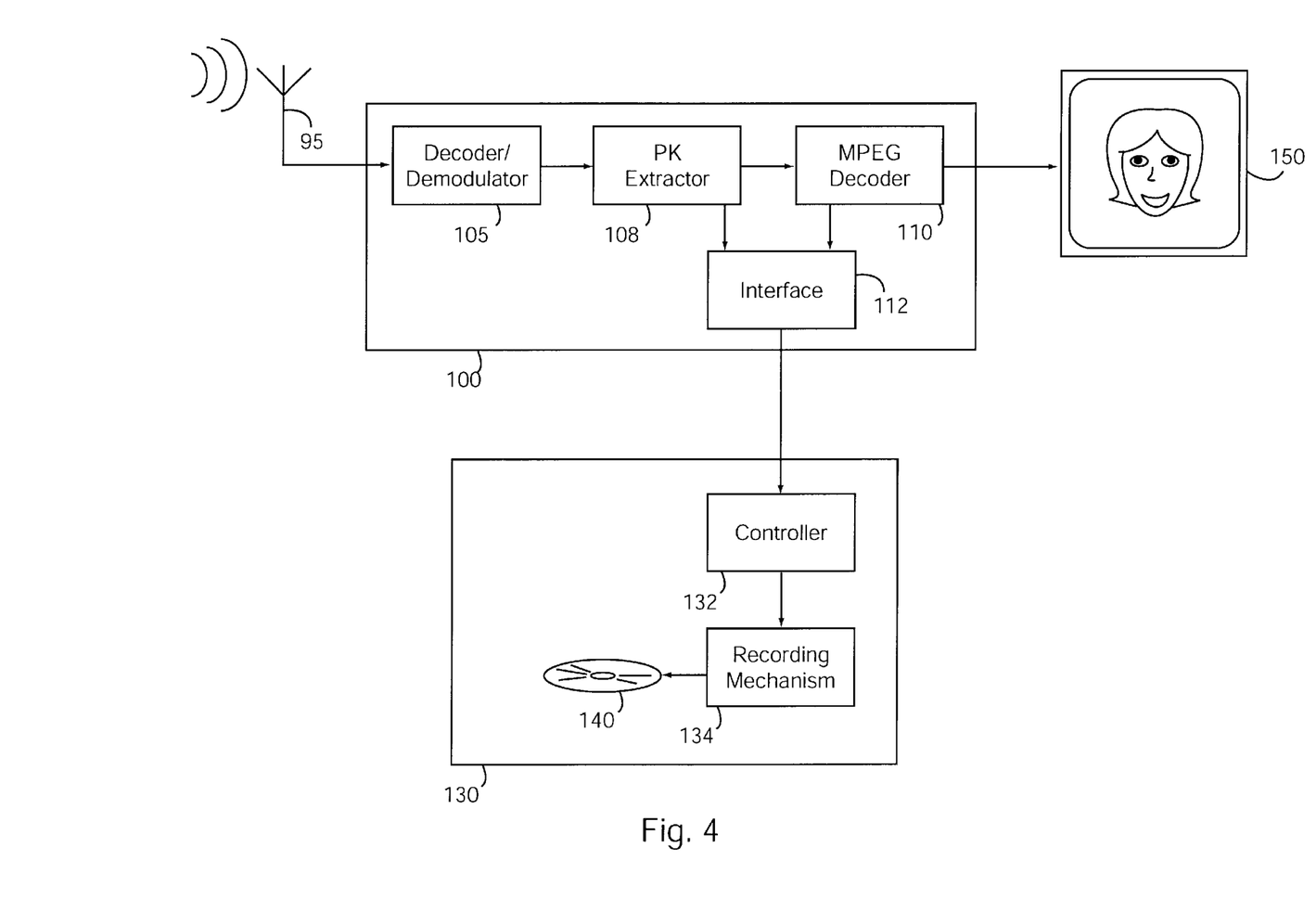
FIG. 4 illustrates a receiving system in accordance with an embodiment of the present invention.

FIG. 4 illustrates a receiving system in accordance with an embodiment of the present invention. The recording system includes an antenna 95, a set top box or receiver 100, a monitor 150 and a recording device 130. Receiver 100 includes a demodulator/decoder 105, a permission key extractor 108, an MPEG decoder 110 and an interface controller 112. Antenna 95 receives transmitted content broadcast over radio frequencies and provides the content to receiver 100. The content includes an encoded watermark and an encrypted permission key. In alternate embodiments, the transmitted content may be transmitted to the receiver 100 through a cable, satellite transmissions, optical fiber, the Internet or any other suitable communication medium.

In the illustrated embodiment, demodulator/decoder 105 typically demodulates the transmitted content from radio frequency to a base band frequency. In alternate embodiments, demodulator/decoder 105 decodes the transmitted data from a particular type of transmission coding scheme. Permission key extractor 108 receives the content and extracts the permission key included within the transmitted content. Permission key extractor 108 provides the permission key to interface 112. At this point, the permission key is still encrypted and requires decryption before the permission key may be utilized. An encrypted permission key is preferred in order to prohibit access to the actual permission key except by the recording device. Permission key extractor 108 provides the transmitted content and watermark to MPEG decoder 110 with the permission key extracted from the stream of data.

MPEG decoder 110 decompresses the transmitted content from the MPEG compressed format and provides-the original video image along with the encoded watermark to monitor 150. MPEG decoder 110 further provides the MPEG compressed video image along with the watermark to interface 112. The content provided to interface 112 is not necessarily decompressed to facilitate the transfer of the data to recording device 130.

Recording device 130 includes a controller 132, a recording mechanism 134 and a recording medium 140. In the illustrated embodiment the recording medium 140 is a DVD disc 140. As can be appreciated, any suitable type of recording medium may be utilized in accordance with the present invention. By way of example, magnetic tape, magnetic disk, optical disk, magneto-optical disk, digital audio tape and any other suitable type of recording medium may be used.

Controller 132 communicates with interface 112 in order to retrieve the MPEG compressed data and the encrypted permission key from receiver 100. Controller 132 receives the data and the permission key and determines whether the permission key corresponds to the transmitted data such that a copy is authorized of the transmitted data. Initially, controller 132 partially decompresses the MPEG compressed data in order to verify that the data contains a watermark. The presence of the watermark and/or the value of the watermark may indicate to the controller 132 whether the transmitted content is copy protected or is free to be copied by the viewer. In one embodiment, the mere presence of a watermark may indicate that the transmitted content is copy protected. In that case copy protection means that the viewer is entitled to make one copy of the transmitted content for time shifting purposes. However, the viewer is not entitled to make further copies of the transmitted content. The use of the permission key along with the watermark ensures that the viewer is allowed to make one copy but not any further copies.

Controller 132, after detecting a watermark in the transmitted content, determines if a permission key has been transmitted along with the content. If a permission key is present the controller 132 compares the permission key to the watermark to ensure that they correspond with each other. If controller 132 receives a valid permission key that corresponds to the transmitted content the controller 132 then provides the MPEG compressed content to recording mechanism 134. Recording mechanism 134 records the MPEG compressed content, which includes the original video image and the watermark in an MPEG format, on DVD disc 140. Again, the permission key is not included with the content and the watermark on DVD disc 140. The absence of the permission key prevents any further copying of the content stored on DVD disc 140.

Figure 5:
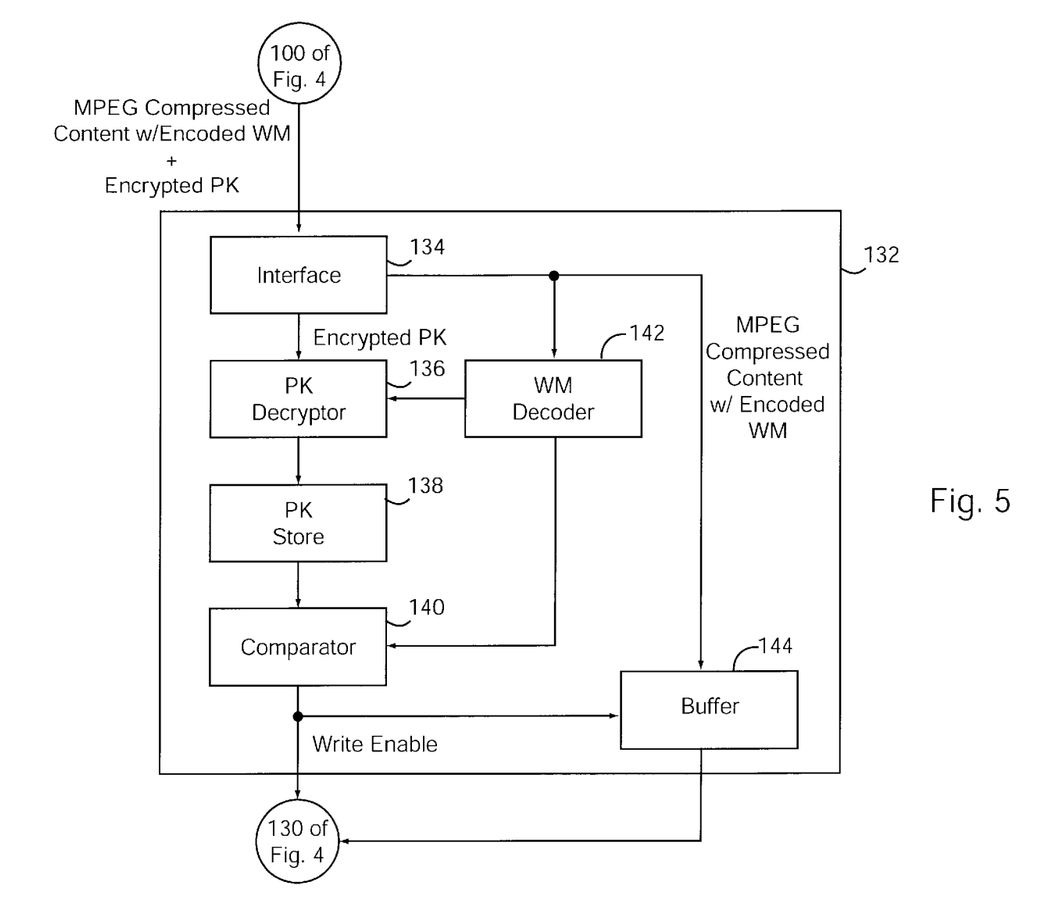
FIG. 5 illustrates a block diagram of controller 132 in accordance with one embodiment of the present invention.

FIG. 5 illustrates a block diagram of controller 132 in accordance with one embodiment of the present invention. Controller 132 includes an interface 135, a permission key decryptor 136, a permission key store 138, a comparator 140, a is watermark decoder 142 and a buffer 144.

Interface 134 communicates with interface 112 of receiver 100. Interface 135 receives the MPEG compressed content along with the encoded watermark and an encrypted permission key from receiver 100. Interface 135 provides the encrypted permission key to permission key decryptor 136. Permission key decryptor 136 decrypts the permission key. Any suitable type of encryption scheme may be utilized in accordance with the present invention. By way of example, a CSS scheme between a receiver and a recorder to authenticate the data.

Permission key decryptor 136 provides the permission key to permission key store 138. Permission key store 138 stores the permission key for a duration of time. Preferably, the duration of time does not exceed the time necessary for recording. Further, the permission key store may be placed in a secure area to prevent access to the permission key. By way of example, permission key store 138 may be embedded within an integrated circuit device such that access to permission key store 138 is impractical.

In one embodiment permission key store 138 may store the permission key for the duration of the transmitted content. In an alternate embodiment a single piece of the transmitted content may require more than one permission key for different segments of the transmitted content. By way of example, content that is one hour long may require a permission key for each fifteen-minute segment. In that case, a new permission key is transmitted to the receivers along with the content at the appropriate time intervals. Permission key store 138 then receives a new permission key and stores it accordingly such that the transmitted content may be continuously recorded without interruption.

Interface 135 also provides the MPEG compressed content along with the encoded watermark to watermark decoder 142. The MPEG compressed content and the watermark are also provided to buffer 144. However, the MPEG compressed content and the watermark are not passed along to the recording mechanism 134 of recording device 130 until comparator 140 has provided the appropriate signal to buffer 144.

Watermark decoder 142 receives the MPEG compressed content and the encoded watermark and partially decompresses the content. Watermark decoder 142 decompresses the MPEG compressed content enough such to extract the watermark from the compressed content. Watermark detector 142 then provides the values of the watermark to comparator 140. Again, the value sent by watermark decoder 142 to comparator 140 may be as simple as an indicator that a watermark does exists in the compressed content.

In alternate embodiments, watermark decoder 142 may also pass along the actual value of the watermark. The value of the watermark may be compared to the permission key, which provides a validation code that is a function of the watermark and the permission key. Alternately, the watermark may provide an encryption key that permits the decryption of the permission key. In which case the encryption key is provided to permission key decryptor 136. Other suitable methods of interrelating the permission key and the watermark may be utilized in accordance with the present invention.

In the illustrated embodiment, permission key store 138 provides the permission key to comparator 140. Comparator 140 compares the permission key stored in permission key store 138 and the watermark provided by watermark decoder 142. Comparator 140 may do a simple compare, such as comparing the permission key and the watermark are both valid. In alternate embodiments, comparator 140 may form some function based upon the values of the permission key and the watermark to provide a validation code.

The validation code determines whether the transmitted content may be passed along to the recording mechanism 134 and recorded onto a recording medium 140. Once a valid watermark and a valid permission key are obtained, or no watermark exists indicating that the transmitted content is not copy protected, controller 132 provides a write enable signal to recording mechanism 134. The write enable signal is also passed along to buffer 144 which allows the MPEG compressed content and the encoded watermark to be passed along to the recording mechanism 134. Recording mechanism 134 records the MPEG compressed content with the encoded watermark onto recording medium 140.

Recording medium 140, thereby, contains the transmitted content, which has encoded in it a watermark. The content is also compressed in an MPEG format. Thus when the recording medium 140 is played back it plays back the content with the encoded watermark. If another compatible recording device is connected to recording device 130, in an attempt to copy the content stored on recording medium 140, the compatible recording device will detect the watermark and will require a permission key. Since no permission key is stored on recording medium 140 the other compatible recording device will not be authorized to copy the contents stored on recording medium 140 onto another recording medium.

Figures 6A, 6B:
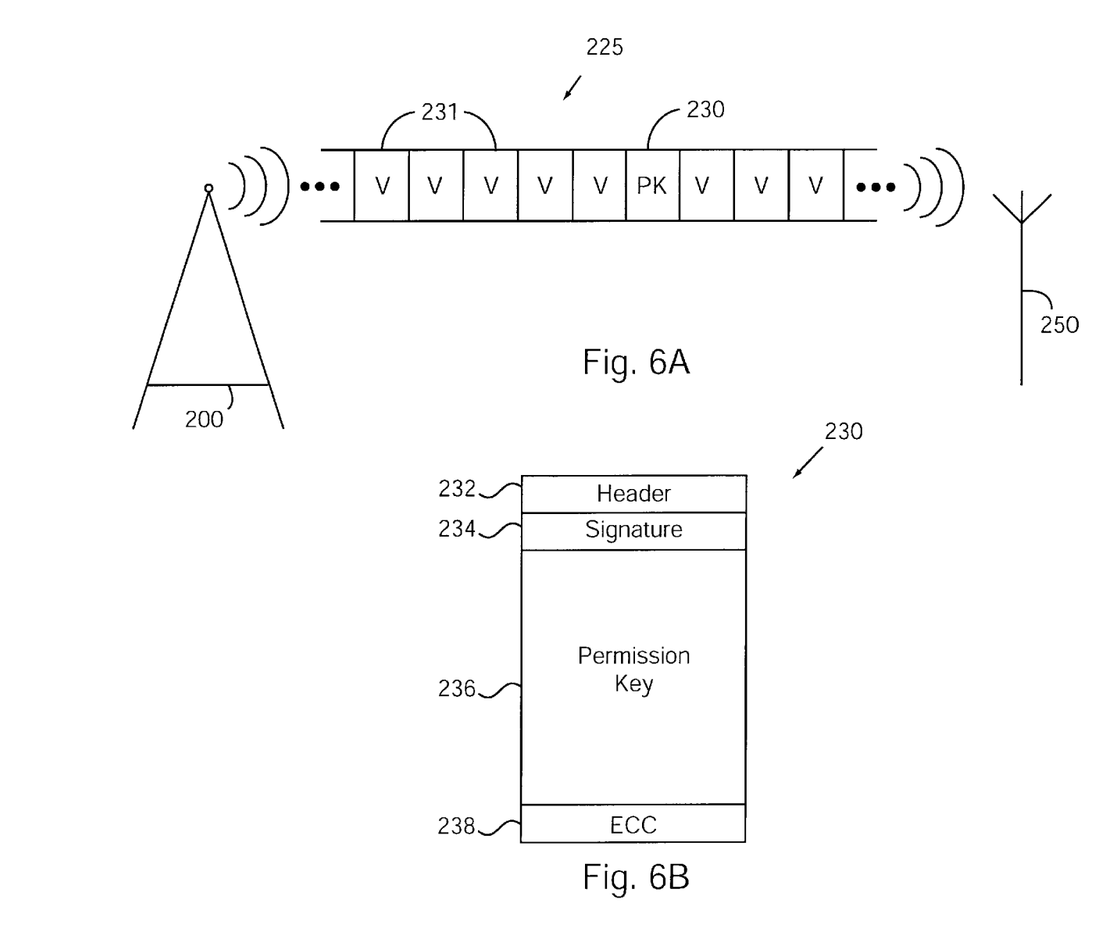
FIG. 6A illustrates the transmission of video data along with a permission key in accordance with an embodiment of the present invention.
FIG. 6B illustrates a permission key packet in accordance with an embodiment of the present invention.

FIG. 6A illustrates the transmission of video data along with a permission key in accordance with an embodiment of the present invention. The communications system includes a transmitter 200 and a receiver 250. Transmitter 200 sends video and permission key information 225 over radio frequencies. Analogously, video and permission key information 225 may be transmitted over a cable, fiber optics, or any other suitable transmission medium.

Video and permission key information 225 includes a permission key packet 230 and video information packets 231. The video and permission key information 225 may be transmitted in any format of communication. By way of example, the information may be transmitted in an analog format or a digital format.

In the illustrated embodiment, permission key packet 230 is in a digital format and the different elements of permission key packet represent bytes of information comprising the permission key packet 230. FIG. 6B illustrates a permission key packet in accordance with an embodiment of the present invention. Permission key packet 230 includes a header 232, a signature 234, a permission key 236 and error correction coding 238.

Header 232 typically includes information that informs the receiving device about the size and content of permission key packet 230. Signature 234 is a unique combination of bits that informs the receiving device that the packet is a permission key packet. By way of example signature 234 may be 256 bytes long. That is, signature 234 includes 4096 bits of information. Assigning one unique combination as a signature, which informs the receiver that the packet contains an encrypted permission key, prevents any confusion by the receiver as to the content of the permission key packet 230. By way of example, a 256 byte long signature may have $2^{4096}$ different combinations. By choosing just one of the different potential combinations as a signature prevents the receiving device from mistaking the permission key packet 230 from video information packets 231.

Once the receiver has determined that permission key packet 230 does contain a permission key, the receiver may then extract the encrypted permission key 236. The encrypted permission key 236 itself need not be extraordinarily large. By way of example, the actual length of the encrypted permission key may be 2048 bytes minus the 256 bytes used as a signature. Thus, the encrypted permission key and the signature do not require a large amount of bandwidth in order to be transmitted to the receiving device. The encrypted permission key 236 may be encrypted in any suitable encryption format.

The permission key packet 230 may also be error correction coded in order to detect and correct any errors in transmission. Error correction coding 238 contains the error correction code information necessary to be able to detect and correct errors in the packet 230 as received.

Figure 7:
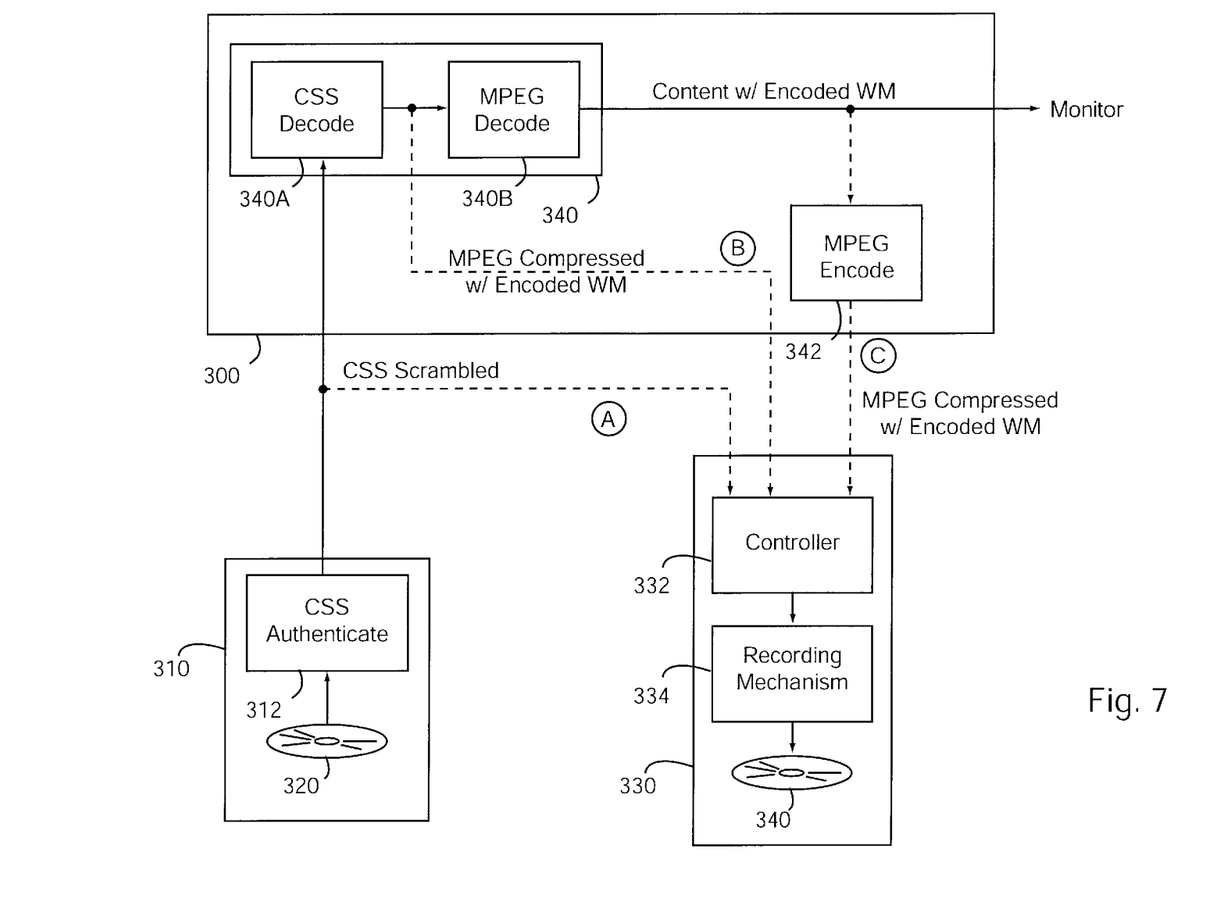
FIG. 7 illustrates a potential unauthorized copying system and the ability of the present inventions to thwart unauthorized copying in accordance with an embodiment of the present invention.

FIG. 7 illustrates a potential unauthorized copying system and the ability of the present invention to thwart unauthorized copying in accordance with an embodiment of the present invention. The copy system includes a player 310, a computer 300 and a recording device 330. A player 310 includes a CSS authenticator 312 and a DVD disc 320 that contains content that is MPEG compressed, CSS scrambled and includes an encoded watermark. CSS authenticator 312 allows the content of DVD disc 320 to be played back to computer 300. However, the played back data is still MPEG compressed and includes an encoded watermark. CSS code information is passed along to computer 300 to allow playback of the data.

Recording device 330 includes a copy protection compatible controller 332, similar to controller 132 of FIG. 5. Recording device 330 also includes a recording mechanism 334 and a recording medium 340, which is another DVD disk.

The data may be diverted through route A to recording device 330, however, the data does not include the actual CSS code necessary to decode the CSS scrambled data. The CSS scrambled data obtained from player 310 is provided to controller 332. Controller 332 may permit the data to be passed along to recording mechanism 334 and subsequently to DVD disc 340. The information recorded on DVD disc 340 is CSS scrambled, which cannot be played back because the CSS code is not included in the information.

Once CSS authentication 312 has occurred, the data from DVD disc 320 is passed along to decoder 340 of computer 300. Decoder 340 is a single device, such that the elements of the decoder cannot be accessed without a great amount of effort.

By way of example, decoder 340 may be a single integrated circuit device. Decoder 340 includes a CSS decoder 340A and a MPEG decoder 340B.

CSS decoder 340A first descrambles the data provided by player 310. MPEG decoder 340B receives the descrambled data, which includes MPEG compressed content with an encoded watermark and decompresses the content and the watermark. MPEG decoder 340B provides the content with the encoded watermark to an external device, for example, a monitor.

Should a purchaser or viewer be able to obtain access into the inner workings of decoder 340 and the descrambled data provided by CSS decoder 340B the purchaser will still not be able to properly record the information. Assuming data stream route B exists, that data stream includes compressed MPEG data with an encoded watermark. The data stream B is received by controller 332, however, controller 332 detects the watermark in the MPEG compressed data and looks for a permission key. Since no permission key is available to controller 332, controller 332 does not pass along the information to recording mechanism 334 or DVD disc 340.

An alternate attempt to make an unauthorized copy is to obtain the decompressed content from MPEG decoder 340B and to re-compress the content and record it with recorder 330. Typically, decompressed content is too large to easily record on a single piece of recording medium, therefore, it is typically required that it be re-compressed in order for subsequent recording. However, the decompressed data still includes the encoded watermark. The watermark is actually a part of the content, but it is not discernible to a viewer or listener. Fortunately, the watermark is detectable by devices such as described in relation to the present invention.

Computer 300 may include an MPEG decoder 342 implemented particularly for the purpose of producing an unauthorized copy. The decompressed content and the encoded watermark are provided to the MPEG decoder and re-compressed. The compressed data is passed along data stream C to recording device 340. Again, the data passed along stream C includes the content and the encoded watermark, but no permission key. As in the case of route B, the lack of a permission key prevents controller 332 from recording the information on DVD disc 340.

Figure 8:
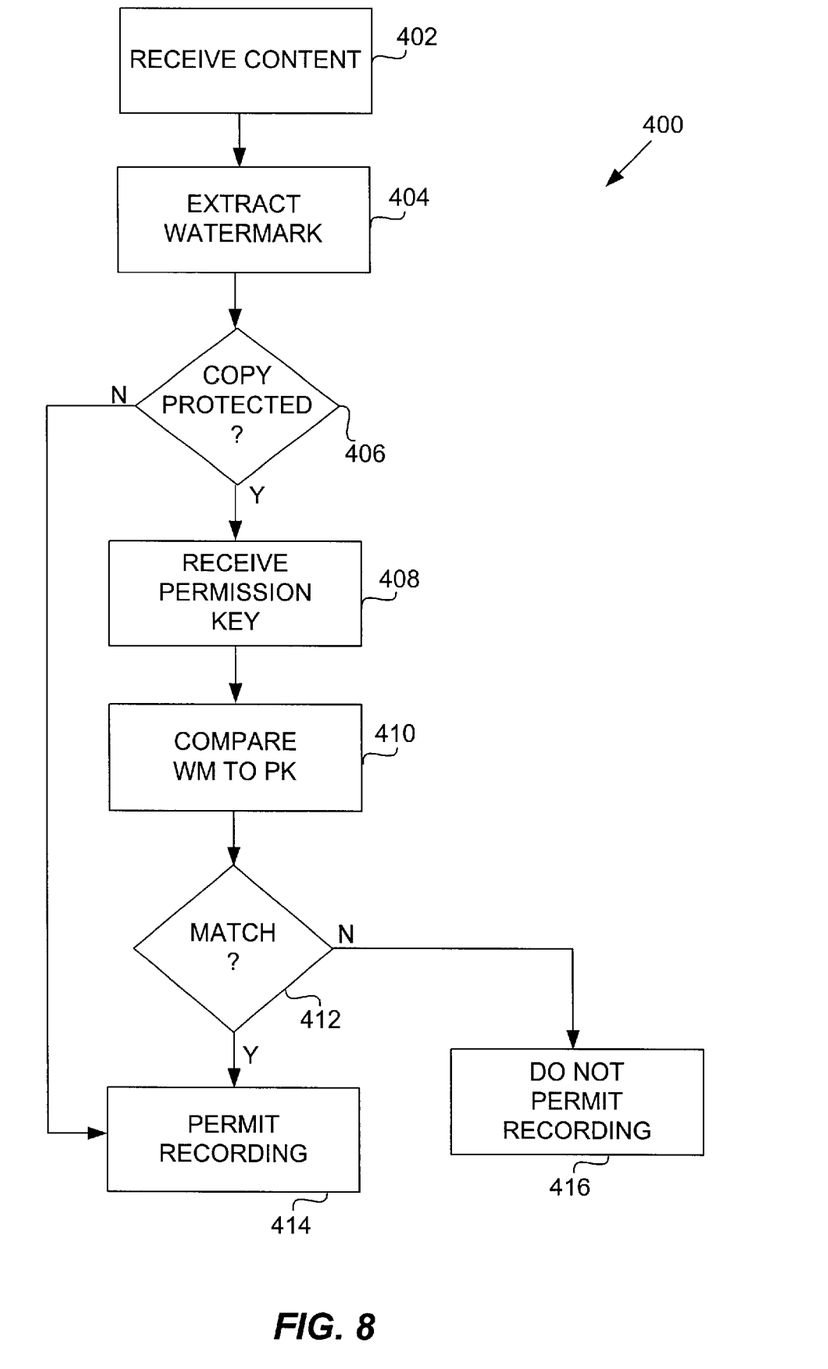
FIG. 8 illustrates a flowchart describing the operations of a copy protection compatible recording device in accordance with an embodiment of the present invention.

FIG. 8 illustrates a flowchart 400 describing the operations of a copy protection compatible recording device in accordance with an embodiment of the present invention. Flowchart 400 begins at block 402 where the recording device receives content from a source. The source may be another playback or recording device or output from a set top box receiver.

Proceeding to block 404, the recording device attempts to extract a watermark from the content if one is contained in the content. In block 406 the recording device determines whether the content is copy protected based upon the presence and/or value of the watermark. If the content is not copy protected the recording device permits recording of the content in block 414. If the content is copy protected the recording device looks for a permission key.

In block 408 the recording device receives a permission key from the source. Of course, if no permission key is provided, the recording device does not permit recording of the content. Once the permission key is received the recording device compares the watermark to the permission key in block 410. In block 412 the recording device compares the permission key to the watermark to ensure that they correspond to each other. If there is a match, the recording device permits recording in block 414. If there is no match, then the recording device is not permitted to record the content in block 416.

Figure 9A:
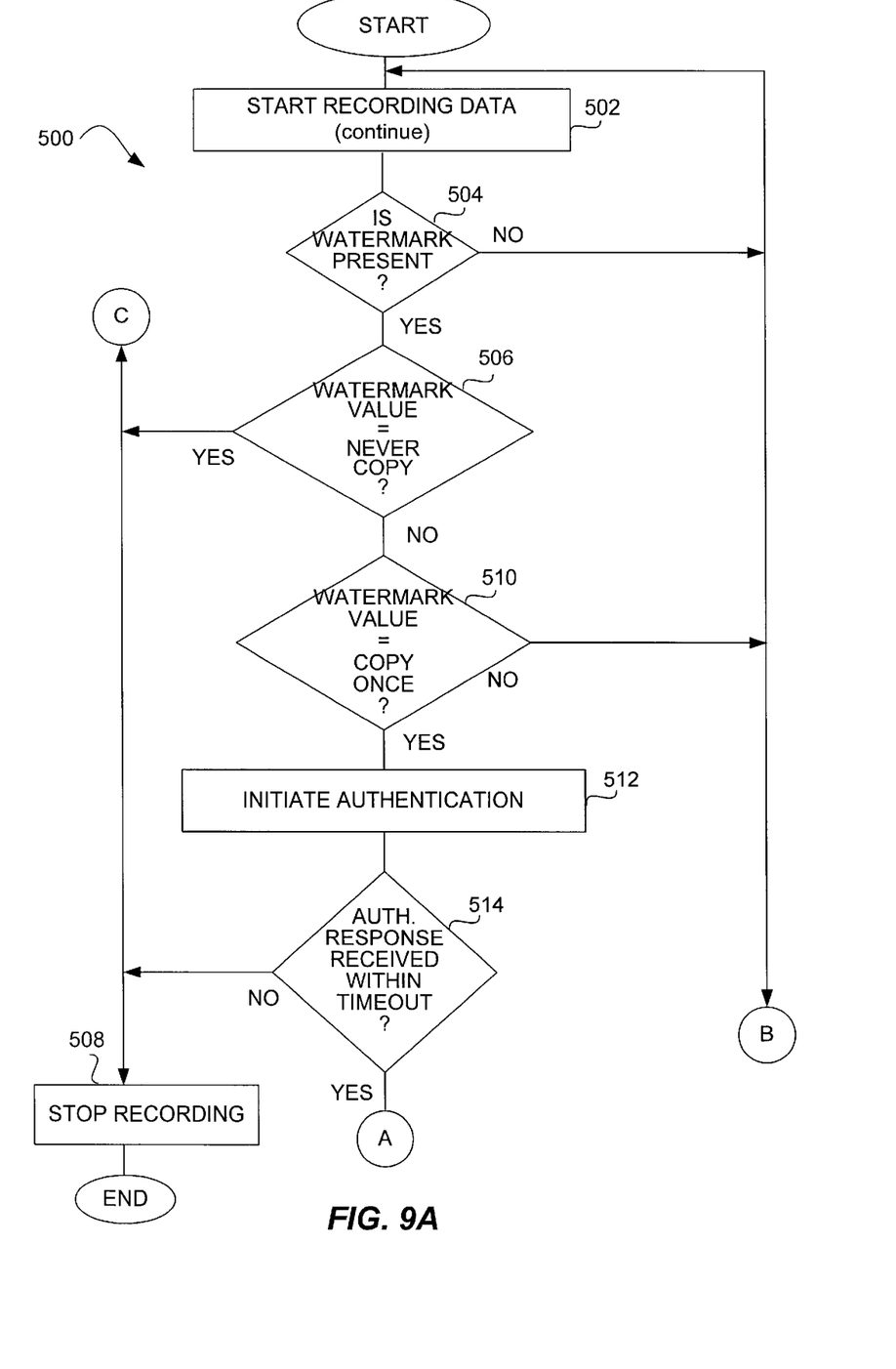
FIGS. 9A and 9B are flow diagrams of a copy protection processing 500 according to an embodiment of the invention.
Figure 9B:
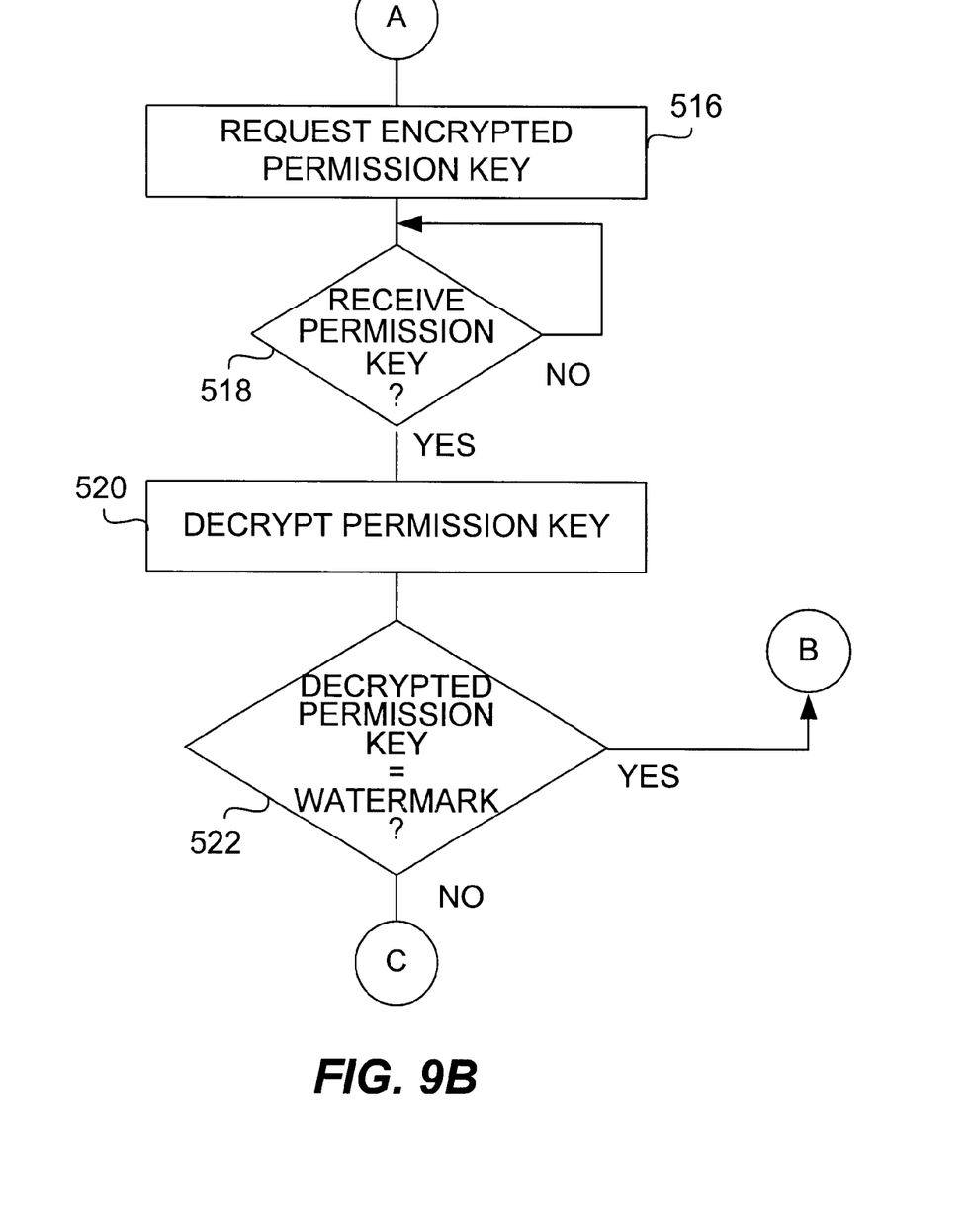

FIGS. 9A and 9B are flow diagrams of a copy protection processing 500 according to an embodiment of the invention. The copy protection processing 500 is, for example, a more detailed embodiment of the processing illustrated in FIG. 8. The copy protection processing 500 is performed by a recording device that operates to record electronic data to a computer readable medium, such as a compact disc, random access memory (RAM), read-only memory (ROM), DVD-disc, etc.

The copy protection processing 500 begins at block 502 where the recording of electronic data is started. Here, the recording device begins to operate to store the electronic data associated with content being received from a source. As an example, the source (or host) can be a set top box, a computer or a video signal source. In general, the watermark can be placed anywhere in the content. Next, at block 504, it is determined whether a watermark is present in the data of the content being stored (or being prepared to be stored). As the recording device is obtains electronic data to be recorded, it also observes the electronic data to check whether a watermark is present. When it is determined that a watermark is not present at block 504, then the copy protection processing 500 returns to repeat the block 502 such that the recording of the electronic data can continue.

On the other hand, when it is determined at block 504 that a watermark is present, a watermark value associated with the watermark is compared with a value associated with "never copy" permission at block 506. These values are typically numeric or alphanumeric values. When it is determined that the watermark value is equal to the value associated with "never copy" permission at block 506, the recording of the electronic data by the recording device is stopped at block 508. Following block 508, the copy protection processing 500 is complete and ends.

Alternatively, when it is determined at block 506 that the watermark value does not equal the value associated with "never copy" permission, then at block 510 it is determined whether the watermark value is equal to the value associated with "copy once" permission. When the watermark value is determined to be not equal to the value associated with "copy once" permission, then the copy protection processing 500 returns to repeat the block 502 and subsequent blocks and the recording of the electronic data continues.

On the other hand, when the watermark value is determined to be equal to the value associated with "copy once" permission in block 510, authentication is initiated at block 512. Following block 512, it is determined in block 514 whether an authentication response has been received within a predetermined timeout period. In one embodiment, the authentication is initiated by a challenge to the source of the content, and then in response to the challenge a response is issued back to the recording device by the source. Each of the recording device and the source would typically include a secret key that would be used in the authentication process as is known in the art. When it is determined in block 514 that the authentication response has not been received within the predetermined timeout period, then the recording of the electronic data is stopped in block 508. Following block 508, the copy protection processing 500 is complete and ends.

When the authentication response is determined to be timely received in block 514, an encrypted permission key is requested in block 516. Here, the recording device requests the encrypted permission key from the source of the content. Here, the permission key is preferably encrypted because it is open to capture when being send over an unsecure link from the source to the recording device. Next, at block 518, it is determined whether the permission key has been received from the source. The copy protection processing 500 will await the receipt of the permission key for a predetermined timeout period. In one embodiment, when the permission key is not received by the recording device within the predetermined period of time, the recording can be stopped. In any case, when the permission key is received, the permission key normally has an encrypted format because it is transmitted over an unsecure link between the source and the recording device as noted above. Hence, the permission key is decrypted at block 520. The advantage of using an encrypted permission key is that unauthorized persons would not be able to spoof the copy protection scheme by obtaining a copy of the permission key using it for recording of other content. In one embodiment, the transmission of the permission key and the authentication are related to each other. Namely, as an example, the transmission of the permission key can be done using an authentication technique (e.g., a challenge/response technique such as CSS). Such authentication techniques operate to authenticate a source as a compliant device and may also establish a randomly varying key transaction, thereby preventing an unauthorized source from spoofing the recording device by sending a permission key copied during an earlier authentication period.

Following block 520, the decrypted permission key is compared with the watermark in block 522. When it is determined in block 522 that the decrypted permission key is equal to the watermark, then the copy protection processing 500 returns to repeat the block 502 and subsequent blocks so that the recording of the electronic data can continue. In this case, the watermark was present in the content to be recorded and authorizes the recording of such content by the recording device. Alternatively, when the decrypted permission key does not equal the watermark, then block 522 causes the recording of the electronic data to stop at block 508. Following block 508, the copy protection processing 500 is complete and ends. Thus, when the decrypted permission key does not equal the watermark, then the copying of the electronic data is not permitted. In other words, whenever the recording of the electronic data of the content is stopped (block 508), the content is in effect not stored on the computer readable medium (recording medium).

Any portion of the content that was stored before the watermark was detected would typically be removed from the computer readable medium. By placing the watermark near the beginning of the electronic data for the content is helpful to reduce the amount of data that could potentially have already been stored when the watermark is detected. The watermark value not only can distinguish different levels of copy protection for respective content, but also be used as an initiator for a request for authentication and/or permission keys. Therefore, a system of copy protection, which possesses a higher degree of flexibility and functionality than other types of copy protection schemes. By utilizing a permission key that is transmitted with content encoded with a permission key, a single-copy protection scheme may be employed. A viewer is able to view and make a single copy of content that is transmitted, but the viewer is not given access to the permission key and prevented from making further copies.

A single-copy protection scheme addresses the concerns of content creators and providers. At the same time, the viewers and purchasers of content are allowed to make copies for time-shifting purposes. Thus, the present invention help to meet the needs of both content providers and consumers.

In another embodiment, different levels of copy protection are supported by the present invention. Of course, the watermark and the permission keys may be configured to prevent any copies being made of transmitted or recorded content. By way of example, content may be transmitted without a permission key, which prevents any recording.

In an alternate embodiment, the watermark may indicate that a variable number of copies may be made. By way of example, the watermark may indicate that two copies may be made. The first copy may be made with a first permission key. After the first copy is made the watermark may be altered to indicate that only one copy is permitted. The second copy may then require a second permission key. While multiple copy embodiments may provide greater exposure to unauthorized copying, these embodiments may provide useful features for content providers in terms of secondary sales of content.

While this invention has been described in terms of several preferred embodiments, it is contemplated that alternatives, modifications, permutations and equivalents thereof will become apparent to those skilled in the art upon a reading of the specification and study of the drawings. It is therefore intended that the following appended claims include all such alternatives, modifications, permutations and equivalents as fall within the true spirit and scope of the present invention.

What is claimed is:

1. A method of copy protecting content comprising:
   receiving content to be recorded, the content including a watermark encoded in the content and the watermark indicating that the content is copy protected;
   receiving an encrypted permission key;
   decrypting the encrypted permission key providing a decrypted permission key;
   extracting the watermark from the content;
   comparing the decrypted permission key and the watermark to determine if the decrypted permission key and the watermark match; and
   permitting the recording of the content if the decrypted permission key and the watermark match and otherwise prohibiting the recording of the content.

2. A method as recited in claim 1, wherein the watermark is embedded in the content such that the watermark is configured to be extracted from the content if the watermark is known, and the watermark is not easily extracted from the content if the watermark is not known.

3. A method as recited in claim 1, wherein a copy protection status of the content indicated by the watermark permits the recipient to read the content but does not allow the recipient to record the content unless the recipient possesses a permission key.

4. A method as recited in claim 3, further comprising:
   recording the content and the watermark on a recording medium, wherein the recipient is permitted to read the content and the watermark from the recording medium but not permitted to record the content and the watermark on an other recording medium.

5. A method as recited in claim 3, further comprising:
   transmitting the content with the watermark to the recipient; and
   transmitting the permission key to the recipient, wherein the permission key is a one time use permission key such that the recipient is permitted to read the content and the watermark and permitted to record the content and the watermark once on a recording medium, and the recipient is not permitted to record the permission key such that the content and the watermark cannot be recorded more than once without the permission key.

6. A method as recited in claim 5, wherein the permission key is a variable permission key that varies over the transmission of the content and the watermark such that more than one permission key is required to record the content and the encoded watermark.

7. A method as recited in claim 5, wherein the recording medium is a digital versatile data disc.

8. A method as recited in claim 1, wherein the content includes at least one of audio and video content.

9. A method as recited in claim 1, wherein the content is digital content.

10. A method as recited in claim 1, wherein the content is digital television content.

11. A method as recited in claim 1, wherein said method further comprises:
    authenticating the source of the content before or concurrently with the receiving of the encrypted permission key.

12. A method as recited in claim 1, wherein said method further comprises:

preventing the recording of the encrypted or decrypted permission key.

13. A method as recited in claim 1, wherein the watermark indicates that the content may be copied once.

14. A method as recited in claim 1, wherein the watermark indicates that the content may not be copied.

15. A method as recited in claim 1, wherein the watermark indicates a level to which the content may copied.

16. A computer readable medium including computer program code for copy protecting content, said computer readable medium comprising:

computer program code configured to receive content to be recorded, the content including a watermark encoded in the content and the watermark indicating that the content is copy protected;

computer program code configured to receive an encrypted permission key;

computer program code configured to decrypt the encrypted permission key providing a decrypted permission key;

computer program code configured to extract the watermark from the content;

computer program code configured to compare the decrypted permission key and the watermark to determine if the decrypted permission key and the watermark match; and computer program code configured to permit the recording of the content if the decrypted permission key and the watermark match and otherwise prohibiting the recording of the content.

17. A computer readable medium as recited in claim 16, wherein said method further comprises:

computer program code configured to authenticate the source of the content before or concurrently with the receiving of the encrypted permission key.

18. A computer readable medium as recited in claim 16, wherein said method further comprises:

computer program code configured to prevent the recording of the encrypted or decrypted permission key.

* * * * *